3,141,238
METHOD OF LOW TEMPERATURE BONDING FOR SUBSEQUENT HIGH TEMPERATURE USE
George G. Harman, Jr., Washington, D.C., assignor to the United States of America as represented by the Secretary of Commerce
No Drawing. Filed Nov. 22, 1960, Ser. No. 70,919
2 Claims. (Cl. 29—498)

This invention relates to the bonding of metals to one another and to the bonded structure so produced.

In soldering metals to one another, it is common to use a soldering material having a melting point much below the melting point of the metals to be bonded. The metals to be bonded are heated to the melting point of the solder and the liquid solder is flowed into the joint to be connected and permitted to cool. The resulting joint, if well made, will have strength characteristics in shear just about equal to the shear characteristics of the soldering material and its melting point will be substantially that of the solder.

It has long been recognized that it would be very desirable to have a solder that could be applied under low temperature conditions and yet, after application, would have resistance to much higher temperatures. In this way, the solder could be applied with relatively little heating and yet the joint so produced would be resistant to high heat.

Prior to the present invention, the foregoing ideal has not been achieved. It is therefore an important object of the present invention to provide a method of bonding metals to one another by using a bonding material which can be applied under relatively low temperature conditions and which will maintain a strong bond under temperature conditions considerably above those prevailing at the time of application.

An important utility of the present invention is that large areas can be soldered without the attendant heating problem which is particularly acute when the parts to be bonded are adjacent to insulation or other plastic material which will melt at the temperature of ordinary solder.

According to the present invention it has been found that multimetallic liquid phase or unhardened alloys may be used as bonding agents. These alloys include a liquid constituent and a normally solid one in the form of a finely divided powder. The liquid and solid constituents may be mixed to form a paste when operating at room temperatures. Where the liquid constituent becomes liquid at a temperature above room temperature, the bonding mixture may be applied to the surfaces to be bonded as a solid and the liquid constituent brough into liquid phase by subsequent heating. Thus, regardless of the temperature of operation, the bonding material is pasty at the beginning of the bonding operation. The pasty condition results from the fact that the liquid and solid phases of the mixture take time to alloy and, while this alloying is in progress, the mixture is a thick pasty liquid. The surfaces coated with the paste are pressed together and so held until the alloying goes to completion. During this compression the surfaces to be bonded must not only be in compression but must, of course, be held at a temperature high enough to maintain the still unalloyed liquid constituent of the bonding material in liquid phase.

One bonding material which has been used with considerable success is made with gallium as the liquid constituent. Gallium is a metal which becomes liquid at temperatures close to ordinary room temperature, i.e. at about 29° C., at standard pressure. It will alloy with metals such as gold, copper, nickel and cobalt. To make a bonding material, one of these metals in finely divided condition, a size which will pass through approximately a 300 mesh screen, is mixed with liquid gallium to a consistency of paste. At this stage alloying between the gallium and the finely divided solid metal is occurring but has not gone to completion. While these conditions prevail, metal surfaces to be bonded may be coated with the gallium-powdered metal paste and thereafter pressed together and held under compression until the unhardened alloy hardens. It is believed that the gallium, the liquid constituent of the unhardened alloy, diffuses into the surfaces to be bonded, alloying therewith, and likewise continues to alloy with the finely divided material, so that when the unhardened bonding material has hardened, the entire bond is an alloy having a melting point very much higher than the melting point of gallium. Thus, it is that one may effect bonding at temperatures in the vicinity of 29° C. and yet produce a joint which will resist temperatures of 800° C. in the case of copper-gallium.

It has been found that best results are achieved if the unhardened alloy of gallium with the powdered metal is applied to a metal chosen from the same group as that from which the powder is chosen. In other words, if the powder is taken from the class consisting of gold, copper, nickel, or cobalt, best results are achieved in bonding a surface of gold, copper, nickel, or cobalt, it being apparent, however, that gold powder in the unhardened alloy can be used for example not only to bond gold, but likewise to bond copper, nickel, or cobalt. It is not necessary to use the gallium alone. It may be mixed with about 10% tin or indium, the effect of an eutectic mixture being to depress the melting point of the liquid part of the unhardened alloy to about 15° C.

In the following table there are set forth some gallium alloys which may be used as bonding materials according to the present invention. It is to be noted that all of these components are liquid at 30° C. and will harden in various lengths of time ultimately to resist a temperature much in excess of the temperature of application.

| Constituents in weight percent | Approx. hardening times at 25° C.,[1] hr. | Maximum useful temperature in air, ° C. |
|---|---|---|
| 1. 44% Cu+24% Sn, 32% Ga | 24 | 600 |
| 2. 50% Cu+18% Sn, 32% Ga | 24 | 650 |
| 3. 66% Cu+34% Ga | 4 | 800 |
| 4. 82% Au+18% Ga | 5 | 425 |
| 5. 66% Au+34% Ga | 8 | 500 |
| 6. 59% Au+41% Ga | 8 | 450 |
| 7. 33% Au+33% Cu+33% Ga | 8 | 600 |
| 8. 49% Au+21% Ag+30% Ga | 2 | 400 |
| 9. 65% Ni+35% Ga | 48 | 200 |

[1] These values assume a particle size to pass through 300 mesh screen. Larger particle sizes may take longer. Setup times at higher temperatures will be considerably less. Five or ten minutes will usually suffice at 200° C. At this temperature the Au-Ga mixture produces an exothermic reaction.

Broadly speaking, the bonding material of the present invention can be used to bond together any metals which will alloy with the liquid constituent. Thus, it is that gold-copper, gold-silver, gold-cobalt, gold-nickel, and copper-silver alloys can be used either as the powder of the solder or as the surface to be bonded, or both. It has been found that at least 50% of the metal of the surface to be bonded should be of a metal which will alloy with the liquid constituent of the bonding material.

For practical purposes, if one is operating without applying heat, except the heat normally present under room temperature conditions, gallium is the choice for the liquid constituent of the unhardened paste, mercury being undesirable because of its well-known adverse physiological effects. On the other hand, if an ambient temperature up to about 250° C. is used, then large numbers of mixtures suggest themselves as capable of being used as the solder. In each case, however, the metals chosen will alloy with one another and one will be liquid and one solid at the chosen bonding temperature. Again, the solid constituent of the bonding material will be a finely divided powder. For best results, the metals to be bonded must be metals which will alloy with the liquid constituents of the bonding agent. The following table sets forth some examples of satisfactory bonding material where the liquid constituent is in liquid phase at temperatures above room temperature but not greater than 250° C.

| Metals | Useful percent range of low M.P. metal | Approximate useful temperature range, ° C. | Approximate curing ambient, ° C. |
|---|---|---|---|
| In-Au | 53-30 | 495 to 450 | 175 |
| In-Cu | 52-30 | 700 to 650 | 175 |
| In-Ag | 33-30 | 600 to 550 | 175 |
| Sn-Cu | 55-30 | 750 to 400 | 250 |
| Sn-Au | 50-30 | 600 to 400 | 250 |
| Sn-Fe | 68-30 | 900 to 800 | 250 |
| Sn-Ni | 55-30 | 1,250 to 1,150 | 250 |

In general the best results are obtained by using combinations in which the low melting component of the bonding agent makes up from 40 to 60% of the entire composition with 30% set as a minimum limit. This is done to achieve uniform wetting of the higher melting powder and the pieces to be fastened. The procedure is mechanically to mix the two (or more) components at room temperature. Where indium is used the powdered metal may be kneaded into a solid strip, or the powders may be mixed and pressed into thin strips. Either the strips or a mixed powder is placed between the metals to be bonded. An appropriate low temperature soldering flux (not a brazing flux) is applied. In some cases it may be desirable to "wet" or "tin" the metal pieces with a very thin coating of the low melting point alloy. The components are then clamped under pressure, and the entire unit is placed in an oven at the appropriate temperature for the chosen alloy. In general, the higher the ultimate working temperature of the alloy the longer the time required in the oven.

As demonstrated by the examples above where tin and indium are added to gallium, it is within the scope of the present invention to add other metals to the liquid constituent of the solder for the purpose of depressing the melting point. In compressing the joints in the application of the unhardened alloy, it is, of course, apparent that a temperature must be maintained sufficient to keep the liquid constituent in liquid phase until the alloy goes to completion.

In applying bonding agents which are solid at room temperature the surfaces to be bonded need not be coated, but instead, a solid phase mixture of the bonding material in unalloyed condition may be placed between the surfaces, and, after the surfaces are under compression, the temperature may be raised to the level necessary to melt the liquid phase constituent. This temperature is then maintained until the alloy goes to completion.

Throughout this specification, there has been reference to the bonding of metals with which the liquid component of the solder will alloy. Such metals may be bonded to very high strengths, but the method of the present invention can be used with metals which will not alloy with the liquid component of the bonding agent. In such cases the bond is a mechanical one and its effectiveness is dependent upon the dimensions of the pieces to be connected and such things as surface roughness. It will be understood where the metal is one which will not alloy with the liquid constituent of the bonding agent, the hardening of the alloy will bring about a bond only to the extent that the alloy is keyed into the surface of the material to be bonded. If the surface to be bonded contains fifty or more percent of a material which will alloy with the liquid component of the solder, the effect is a very high strength joint due to alloying rather than the somewhat weaker joint resulting from the mechanical connection.

Reference has been made to solder having a liquid constituent which is liquid at temperatures lying below 250° C. Obviously, many metals can be made liquid at temperatures above that level, but these are not regarded as practical by reason of the oxidation difficulties at high temperature conditions of operation.

Before bonding according to the method of the present invention, it may be desirable to render the surface chemically clean, but otherwise, the unhardened alloy forming the solder can be applied by simple coating methods such as with a brush even when the area to be covered and bonded is extremely large. Needless to say the application to the surfaces to be bonded must be completed before the alloying of the liquid and solid components of the solder goes to completion.

After the alloy goes to completion it will resist heat to the extent of a homogeneous alloy of that composition. It appears that while the alloy may not be totally homogeneous throughout the joint immediately after it hardens, it will become so when subjected to heat long before the heat reaches the level necessary to melt the joint.

What I claim is:

1. The method of bonding metal which comprises placing between the surfaces to be bonded a bonding agent consisting of a mixture of gallium and at least one finely divided metal of the class consisting of gold, copper, nickel, silver and cobalt, pressing together the surfaces to be bonded, and maintaining them so at a temperature at or slightly above that of the melting point of gallium until said bonding agent forms an alloy and hardens.

2. The method of claim 1 including the step of initially depressing the melting point of gallium by forming a eutectic with a metal selected from the class consisting of tin and indium.

References Cited in the file of this patent

UNITED STATES PATENTS

| 1,640,469 | Ronci | Aug. 30, 1927 |
| 2,503,564 | Reeve | Apr. 11, 1950 |
| 2,671,746 | Brew | Mar. 9, 1954 |
| 2,700,623 | Hall | Jan. 25, 1955 |
| 2,735,050 | Armstrong | Feb. 14, 1956 |
| 2,741,932 | Whitney et al. | Apr. 17, 1956 |
| 2,746,140 | Belser | May 22, 1956 |
| 2,754,238 | Arenberg | July 10, 1956 |
| 2,824,365 | Erckson | Feb. 25, 1958 |
| 3,046,651 | Olmon et al. | July 31, 1962 |
| 3,073,269 | Hoppin et al. | Jan. 15, 1963 |

FOREIGN PATENTS

| 622,071 | Great Britain | Apr. 16, 1949 |